US012296908B2

United States Patent
Bigolin et al.

(10) Patent No.: US 12,296,908 B2
(45) Date of Patent: May 13, 2025

(54) SADDLE FOR VEHICLES, SUCH AS BICYCLES OR MOTORCYCLES (71) Applicant: SELLE ROYAL GROUP S.p.A, Pozzoleone (IT)

(72) Inventors: Barbara Bigolin, Vicenza (IT); Marco Malfatti, Vicenza (IT)

(73) Assignee: SELLE ROYAL GROUP S.P.A., Pozzoleone (IT)

( * ) Notice: Subject to any disclaimer, the term of this patent is extended or adjusted under 35 U.S.C. 154(b) by 117 days.

(21) Appl. No.: 18/012,123

(22) PCT Filed: Jun. 21, 2021

(86) PCT No.: PCT/IB2021/055435
§ 371 (c)(1),
(2) Date: Dec. 21, 2022

(87) PCT Pub. No.: WO2021/260520
PCT Pub. Date: Dec. 30, 2021

(65) Prior Publication Data
US 2023/0234662 A1 Jul. 27, 2023

(30) Foreign Application Priority Data

Jun. 22, 2020 (IT) .................. 102020000014929

(51) Int. Cl.
B62J 33/00 (2006.01)
B62J 1/18 (2006.01)
B62J 1/28 (2006.01)

(52) U.S. Cl.
CPC ................ B62J 33/00 (2013.01); B62J 1/28 (2013.01); B62J 1/18 (2013.01)

(58) Field of Classification Search
CPC .. B60N 2/5685; B60N 1/28; B62J 1/18; B62J 33/00
See application file for complete search history.

(56) References Cited

U.S. PATENT DOCUMENTS 6,290,794 B1 * 9/2001 Yates ................... B62J 1/18
156/290
7,178,866 B1 * 2/2007 Scott ................... B62J 1/12
297/180.12

FOREIGN PATENT DOCUMENTS

CN 110435791 A 11/2019
EP 3643591 A1 * 4/2020 ............... B62J 1/02
JP 2011131856 A 7/2011

OTHER PUBLICATIONS

International Search Report for PCT/IB2021/055435 dated Aug. 19, 2021 (2 pages).
International Preliminary Report on Patentability for PCT/IB2021/055435 dated Oct. 6, 2022 (12 pages).

* cited by examiner

Primary Examiner — Milton Nelson, Jr.
(74) Attorney, Agent, or Firm — Tutunjian & Bitetto, P.C.

(57) ABSTRACT

The present invention relates to a saddle for vehicles, such as bicycles or motorcycles, including a seat component defining a support surface for a user and a base component or felt to which the seat component is constrained or connected, the saddle then including a printed circuit.

22 Claims, 10 Drawing Sheets

SADDLE FOR VEHICLES, SUCH AS BICYCLES OR MOTORCYCLES

TECHNICAL FIELD OF THE INVENTION

The present invention relates to a saddle that can be heated and/or cooled saddle for vehicles, such as bicycles, motorcycles and the like, as well as a method for assembling such saddle.

STATE OF THE PRIOR ART

During the winter season due to the cold, many people choose to use a vehicle such as a car or the like to move around instead of two-wheeled vehicles, such as in particular bicycles or motorcycles.

This obviously leads to an increase in road traffic and, in turn, in pollution.

Saddles provided with heating means have been proposed, but the solutions according to the prior art have not proved satisfactory both from a functional and a constructive point of view.

In this context, documents EP3643591A1, CN110435791A and JP2011131856A describe respective solutions according to the state of the prior art.

SUMMARY OF THE INVENTION

The object of the present invention is therefore to provide a new saddle for vehicles, such as bicycles or motorcycles.

Another object of the present invention is to provide a saddle as indicated above equipped with suitable heating and/or cooling means and/or sensors, for example to give relief to the driver while driving the vehicle in environments with low or high temperatures.

Another object of the present invention is to provide a saddle that can be heated or cooled for vehicles, such as bicycles or motorcycles that ensures reliable power supply of the heating and/or cooling means or elements.

Another object of the present invention is to provide a saddle provided with heating and/or cooling elements which can be operated in a simple and fast way.

Another purpose of the present invention is to provide a saddle that can also be powered even without a battery, and which thus does not require maintenance for the replacement of the latter.

Another object of the present invention is to provide a saddle in which it is possible to heat and/or cool the seating zone in a uniform manner A further object of the present invention is to provide a saddle for vehicles such as bicycles, motorcycles and the like, which is capable of softening the seating zone stiffened by the cold.

Another object of the present invention is to provide a method of assembly a saddle as indicated above which is fast and effective.

According to one aspect of the invention, a vehicle saddle is provided according to the present application.

According to another aspect of the invention, a method according to the present application is provided.

The present application refers to preferred and advantageous embodiments of the invention.

BRIEF DESCRIPTION OF THE DRAWINGS

Further aspects and advantages of the present invention will become clearer from the following detailed description of embodiments of saddle according to the present invention, illustrated purely by way of non-limiting example in the accompanying drawings, in which.

DETAILED DESCRIPTION OF THE INVENTION

With reference to the attached figures, a saddle 1 for vehicles, such as bicycles, motorcycles and the like according to the present invention, has been illustrated.

Such saddle 1 comprises a seat component 2 defining a support surface 2a for a user and a base component 3 which is constrained or connected, with or without interposition of other components, to the seat component 2.

Therefore, the seat component 2 has a first surface 2a which is the external support surface and a second surface 2b which is a surface, in use, internal or facing towards the base component 3. In use, the first surface 2a is upper o facing upwards and the second surface 2b is lower o facing downwards.

The seat component 2 can be the so-called cover or coating of a saddle 1.

This component 2 can be made of any suitable material, for example leather, such as synthetic leather, PVC, PU or other suitable material.

Such component 2 can have any suitable configuration, for example with an enlarged rear portion 2c, a tapered tip 2d and an intermediate portion 2e.

Moreover, the component 2 can include a sheet-like element with a flat or slightly curved main wall 2f and a side wall 2g which extends, in use, downwards from the edge of the flat main wall 2f. Preferably, the side wall 2g is annular.

The side wall 2g or rather the area defined by it can be tapered when approaching the main flat wall 2f.

The support surface 2a is defined by the upper surface of the flat main wall 2f.

The base component 3 comprises a first internal face 3a facing towards the seat component 2 and defining therewith or with the respective second surface 2b an internal zone IZ of the saddle 1 and a second face, if desired external 3b, which second face faces away from the seat component 2 and, in use, downwards and towards the frame of a respective bicycle (not shown in the figures).

More specifically, according to the embodiment illustrated in the figures, the first internal face 2b of the seat component 2 defines a zone of positioning substantially to size for the base component 3, the latter having overall dimensions in plan with shape substantially complementary to the area defined by the side wall 2g and, if the latter is tapered in the above indicated direction, the base component 3 has overall dimensions in plan with shape substantially complementary to the area defined by an intermediate level of the side wall 2g, i.e. a level between the base and the tip of the side wall 2g.

Alternatively, the base component or felt could define a zone of positioning for the seat component, or the two components 2 and 3 could be placed side by side or even abutting each other, if desired, with interposition of the padding by providing suitable means of engagement between such components for assembling the saddle.

The base component 3 can be made of any suitable material, for example a rigid material, if desired in plastic, metal, composite material or other suitable material.

Furthermore, the base component 3 can be made of biodegradable and/or eco-sustainable material.

Preferably, the base component 3 extends from the tip or front to the rear of the saddle 1 and has an enlarged rear portion 3c and a tapered tip 3d of a width substantially equal to that of the seat component 2. Clearly, the base component 3 also comprises an intermediate or central portion 3e connecting the enlarged rear portion 3c and the tip 3d, so that the width (actually in plan) of the base component 3 gradually passes from the width of the portion 3c to that of the tip 3d.

The saddle 1 can then naturally comprise, although this is not necessary, a fork 4 of a suitable configuration whatever is constrained or connected below the base component 3.

As regards in more detail the fork component 4, it can have a prong or a pair of prongs 4a having a pair of rear ends 4b fitted, if desired by forced or snap-in insertion, into suitable seats 3/1, 3/2 of the base component 3 and/or connected to the latter by means of suitable coupling means.

The front end 4c of the fork component 4 can instead be made up of a curved section of the same C-shaped fork component (solution illustrated in the figures), or from two front ends of two prongs. Clearly, also the front end 4c of the fork component 4 can be connected to the base component 3 with any suitable way, such as for example interlocking, coupling or constraint between the base component 3 and a suitable closing component.

According to the non-limiting embodiment illustrated in the figures, thus, the fork component 4 is made using a single suitably bent rod.

The fork component 4, if provided, can be connected to a seat post (not shown in the figures) in a respective central position, for example by any suitable means.

The saddle 1 then comprises at least one complete electronic circuit 5, i.e. including or consisting of a printed circuit or PCB completed with the connected electronic components, in particular soldered to the printed circuit, i.e. a PCBA (Printed Circuit Board Assembly) or MCPCB (Metal Core Printed Circuit Board) or CPU, for example including a main plate or core made of a metal with good thermal conductivity, such as aluminum or copper.

The CPU can also be equipped with other modules, such as a gyroscope or accelerometer.

Moreover, the card can also be equipped with a microprocessor and relative firmware for the management of various inputs.

The board can be equipped with a Bluetooth antenna module, currently used to update the firmware but can also be used to communicate with an external device, after developing a dedicated application or software.

At least one heating and/or cooling element 6 and at least one connector 7 is then provided for wiring or electrically connecting the printed circuit 5 with the heating and/or cooling element 6 or with each heating and/or cooling element 6. The connector 7 or each connector 7 is preferably mounted (electrically connected) to the end or ends 6a of the heating and/or cooling element 6 or of a respective heating and/or cooling element 6.

Preferably, the heating element 6 consists of an electrical resistor, such as a special cable or wire, made of suitable material, for example copper, stainless steel and carbon or fabric treated or coated with graphene.

In the case of a cooling element, it could include for example a peltier cell, which works according to the principle of heat dissipation.

However, other suitable heating and/or cooling means could be used without thereby departing from the scope of the following claims, if desired fluid—such as a liquid or a gas—heating and/or cooling means.

Moreover, the heating and/or cooling element 6 could include a conductive fabric, whose properties could also be exploited to make it also a pressure sensor, for detecting the weight and therefore the presence of a user or mapping of the pressure applied.

According to a variant, a saddle according to the present invention could also, in addition to or as an alternative to a heating and/or cooling element, have one or more sensors, for example pressure sensors designed to perform other functions, for example a pressure sensor integrated in a respective fabric and responsible for giving consent, on the basis of the pressure detected, to the switching on of a light integrated in the saddle or also for other functions, even if desired outside the saddle itself.

If desired, the at least one heating and/or cooling element 6 is located in contact (if desired with the interposition of a support layer, which will be described better later) or within, for a large part of the extension, of the seat component 2 or better of the respective first surface 2a. In this regard, the area defined by the perimeter of the heating and/or cooling element 6 in contact with or within the seat component 2 or the sum of the areas defined by the perimeters of the heating elements 6 in contact or within the seat component 2 is at least 5% or 10% or 20% or 30% or 40% or 50% or 60% or 70% or 80% or 90% of the first surface 2a, without counting the part of the external surface of the seat component defined by the possible side wall 2g.

The heating and/or cooling element 6 is placed in the internal zone IZ or interposed between the seat component 2 and the base component 3 or connected to or embedded in or arranged within the seat component 2.

The heating and/or cooling element 6 is designed to heat and/or cool the seat component 2 and the respective support surface 2a, and thus the heating and/or cooling element 6 must be such as to exchange heat or temperature with the seat component 2 so as to heat and/or cool the support surface 2a.

According to the non-limiting embodiment illustrated in the figures, the heating and/or cooling element 6 is arranged along the entire length of the seat component 2, for example following a pattern or extension symmetrical with respect to the longitudinal or front-rear symmetry axis of the latter, thereby allowing homogeneous coverage of the entire surface.

More specifically, the heating and/or cooling element 6 can be arranged on the seat component 2 (directly or with the interposition of a suitable support layer) according to any geometry so as to affect, as above indicated, the area of the support surface 2a. Preferably, the heating and/or cooling element 6 is arranged in a uniform or non-concentrated manner in a point or zone of the support surface 2a, again without counting the part of the outer surface of the seat component which is defined by the possible wall side 2g.

Advantageously, a support layer 8 of the heating and/or cooling element 6 is provided, for example a fabric layer, for example made of synthetic fiber, for example polyester, nylon, viscose, microfiber, or natural fiber, such as for example cotton, in which the heating and/or cooling element 6 is embedded or to which the heating and/or cooling element 6 is connected, for example by glue or welding. The fabric layer 8 can, for example, have a thickness ranging between 0.2 and 1 mm.

An NTC temperature sensor can also be sewn into the support 8, if desired, provided at the back of the support 8, which sensor is connected to the circuit of the heating and/or cooling element 6.

Clearly, the support layer 8 is not made of insulating material.

Even more advantageously, the support layer 8 is placed on or arranged on or in contact with the internal surface 2b of the seat component 2 and is preferably connected to the latter, for example through connection means, such as for example glue, adhesives or welding.

If desired, the saddle 1 comprises a casing or lid 9 bound to the base component 3, for example by means of suitable first connection means 10a, such as screws, bolts, fittings, hinge, glue or adhesive, the casing or lid 9 and the base component 3 defining or delimiting between them a housing seat HZ for the printed circuit 5, which in use is therefore housed in this seat HZ.

Moreover, suitable second connection means 10b can also be provided, such as screws, bolts, fittings, glue or adhesive for connecting the printed circuit 5 to the base component 3 or to the casing or lid 9, which second connection means 10b are clearly aimed at keeping the printed circuit 5 still, although this could also alternatively or in addition be ensured by the engagement between the cover component 9 and the base component 3.

Moreover, the possible casing or lid 9 can be constrained to the internal face 3a of the base component or base component 3, so that the housing seat HZ is, in fact, within the internal zone IZ.

Clearly, there could also be a different configuration, with component 9 constrained to the external face 3b or casing component 9 inserted in a special opening, if desired through, defined by the base component 3.

The base component 3 and/or the casing or lid 9 can delimit at least one through wiring opening CO and in this case the connector 7, as well as the end/s of the heating and/or cooling element 6, passes through the wiring opening(s) CO to reach the printed circuit board 5.

The wiring opening CO puts the internal zone IZ in communication with the housing seat HZ or in any case with the positioning zone of the printed circuit. In this regard, it is possible that the wiring opening CO houses a portion or socket 5a of the printed circuit 5.

Clearly, the saddle 1 may, although this is not necessary, comprise a padding 11 within the internal zone IZ, which padding can fill the internal zone IZ. In this case, the padding could be housed entirely between the seat component 2 and the base component 3 or even constitute a spacer element between the seat component 2 and the base component 3 so as to be housed between them, but defining a section of the side wall of the saddle, i.e. protruding outwards at its edge.

The padding 11 can be obtained by pouring or injecting a liquid or fluid into the internal zone and subsequent hardening or solidification of the same.

Of course, the material for the padding 11 can be inserted before or after the mutual engagement of the seat component 2 and the base component 3.

Moreover, the padding 11 can preferably constitute the means of constraint or connection of the seat component 2 and the felt component 3.

The housing seat HZ, if provided, is liquid or fluid-tight closed so as to prevent or limit the passage or entry into it from the internal zone IZ of the liquid or fluid for making the padding 11 before the hardening or solidification of the padding itself or the respective fluid/liquid.

Clearly, a solution could be envisaged with padding formed on the seat component 2 and removably connectable, by means of suitable screw, fitting, shape coupling means or means of other type, to the base component 3.

In this regard, see the international application published under number WO2016063218A1.

In this case, one could have a universal base component 3 in which the complete electronics is incorporated and, preferably, sealed, and a series of tops or seat components 2 can then be provided, each with different functions, for example heating top, cooling top, top with mapping of the pressure applied, top with weight sensor, etc.

According to this variant, each seat component should have connectors that come into contact with the base component and automatically connect to the coupling of the seat component.

The presence of the wiring opening CO ensures in particular during the formation of the padding 11, that it possible to bring the connecting means of the heating and/or cooling element 6 out of the internal zone IZ for the proper power supply of the latter, in particular when the padding 11 is formed with a seat component 2 and base component 3 mutually engaged, but in any case, even if this is not the case, it allows the passage through the felt of a power supply component of the at least one heating and/or cooling element 6 or of one end of the latter.

If desired, the base component 3 delimits at least one opening CO, and in this case the printed circuit 5 can have at least one socket 5a projecting or accessible from the and therefore for the passage and connection of the connector 7 through the wiring opening CO.

A first access opening O1 can instead be formed in the base component 3 and/or a second access opening O2 can instead be formed in the lid component 9 for the entrance or passage from the internal zone IZ to an intermediate access area to the wiring opening CO. If desired, if both such openings O1, O2 are provided, the first opening O1 is aligned with the second opening O2 and these openings are formed in respective sections of the base component 3 and of the lid component 9 with a section of the lid component 9 being wound or abutting of or wrapped by a section of the base component 3.

The first O1 and/or second O2 opening can extend in proximity, for example at a distance of 0.5-5 cm from the wiring opening CO.

As regards the electrical supply of the heating and/or cooling element 6, it can be powered by means of a rechargeable or non-rechargeable battery (not shown in the figures), which battery is electrically connected to the printed circuit 5 through at least one connection component, such as, for example, one or more wires and the like.

With regard to this aspect, any electronic element is preferably connected to the board, and the board is then electrically powered (for example by the battery) to then manage the supply of current and anomalies; thus, for example, in the case of current overload (currently set at 12V) a fuse can "intervene".

More in detail, according to this variant, the connection component would include one an end connected to the battery and another end connected to the printed circuit.

Alternatively, the heating and/or cooling element 6 can be powered through the electrical system of a respective bicycle (not shown in the figures) by means of a cable 12 or similar that departs from the printed circuit 5.

A gasket 15, for example adhesive applied and/or fixed, preferably removably, on one or two terminal ends 6a of a cable or wire constituting or fixed to the heating and/or cooling element 6 may be provided.

Clearly, the connector 7 is mounted on the terminal end 6a.

Such gasket 15 is arranged to close an opening CO, O1, O2 for bringing out the connector 7, as well as the terminal end 6a, from the internal zone IZ, such as an opening delimited by the base component 3 or by the casing or lid 9, so as to close, preferably in a fluid tight manner, the internal zone IZ or in any case this opening.

The gasket 15 can be configured as a disk with a circular, rectangular, square or irregular section.

The gasket 15 can delimit a groove 15a in which the cable or wire 6 or better the terminal ends 6a of the same is made to pass.

During the production of the saddle, as will be described later, when the base component 3 is placed on the seat component 2 during the molding for the realization of the padding 11, the adhesive gasket 15 will glue or fix or abut on the cover 9 (on a surface thereof proximal to the seat component 2) or on the base component 3 (depending on the embodiment), closing a respective opening, for example the second access opening O2.

Therefore, electrical power supply means for at least one heating and/or cooling element 6 are generally provided.

A saddle 1 according to the present invention can then comprise at least one button 13 for pressure or control of a respective portion of the printed circuit 5 or of the base component 3 (for example an elastically yielding portion 3r of the felt) in turn in engagement with a portion of printed circuit 5 for the activation or deactivation of the heating and/or cooling element 6 and in this case, the second face 3b of the felt component 3 can delimit a positioning housing PH of the button 13, so that it is possible to activate/deactivate the heating and/or cooling element 6 by pressing a button accessible from under the saddle or from under the base component 3.

Alternatively, the positioning housing PH can be delimited by the casing or lid 9.

The button 13 essentially acts as a switch for the heating and/or cooling element 6, so if this button is pressed, it activates the sending of an electrical signal which opens a switch, thereby allowing the flow of electricity energy supplied by an electrical power supply system (battery or electric system of the bicycle or other) in the heating and/or cooling element 6, which thus provides to heat and/or cool the saddle 1 or better the respective seat component 2.

In this case, the further pressure and subsequent release of the button 13 sends an electrical signal that closes the switch and blocks the passage of electric energy from the power supply system to the heating and/or cooling element 6.

Preferably, the positioning housing PH of the button 13, if provided, is at the bottom of the housing seat HZ or in any case on the side of the latter opposite to that for constraining the casing or lid 9.

Clearly, the button can be provided in other positions of the saddle.

A solution without a button could also be envisaged, but with activation by means of a remote control or in any case remote control so as to be able to remotely activate/deactivate the heating and/or cooling element 6, even if desired from home before going out for a ride on a bike or a race. In this case, the printed circuit 5 would also integrate a communication module with the remote control.

Combinations with pushbutton and remote control can also be clearly envisaged.

The saddle 1 can also comprise a sensor designed to detect the temperature of the saddle or of the respective seat component 2, so as to consequently inform a control unit, for example integrated in the printed circuit 5, so that the latter can, by controlling suitably the activation/deactivation of the heating and/or cooling element 6, maintain the temperature of the seat component 2 substantially constant or in any case above a first minimum value and/or below a second maximum value.

A timer could also be integrated into the saddle or the respective printed circuit 5 to assist a control unit to carry out heating and/or cooling cycles of specific duration.

Furthermore, as indicated above, the saddle 1 could have several heating and/or cooling elements, each for example intended to serve and therefore heat and/or cool a specific portion of the seat component 2. In this case, a control unit, if provided, could result in a controlled and specific heating/cooling for each portion of the seat component 2.

Subject-matter of the present invention is also a bicycle (not shown in the figures) or motorcycle comprising a frame, if desired a seat post supported by the frame as well as a saddle 1 constrained and supported by the frame or by any seat post, for example at the fork 4, if the same is provided.

In this case, the bicycle can be an electric bicycle or in any case the bicycle or motorcycle has an electric power supply system, in which case the printed circuit 5 can or cannot be in electrical connection with the electric power supply system of the bicycle or motorcycle.

So far as the configuration shown in the figures and not limiting of the base component 3 is concerned, it, at the first internal face 3a, has one or some projecting walls 3g1-3g4 constrained to each other so as to define part of the housing seat HZ. More specifically, the projecting walls 3g1-3g4 can define a rectangular, square, circular or generally polygonal area. The projecting walls 3g1-3g4 may have a free end in the same plane, in use, horizontal or slightly inclined with respect to the horizontal.

Such walls 3g1-3g4 are preferably provided proximal to the rear and distal from the front or tip of the base component 3.

The wiring opening CO can be formed in a section of a projecting wall 3g2.

Moreover, for a reason which will be discussed below, a groove or opening 3h can be provided in one of the projecting walls 3g1, in particular frontal or proximal to the front, opening into a channel section 3m with respective delimiting walls extending from such projecting wall 3g1 up to a median portion or portion closer to the front of the base component 3.

The base component 3 then delimits a through hole 3n at the channel section 3m or better in a front position with respect to the end of the same distal from the projecting walls 3g1-3g4. If desired, an annular component, if desired as a plug, is fitted into the through hole 3n.

A saddle according to the present invention can then comprise a box-shaped section 3p of the base component 3 formed, always at or starting from the first internal face 3a, alongside the zone defined by the projecting walls 3g1-3g4 and with a section of wall in common with a projecting wall 3g2.

In this case, the wiring opening CO can be formed in the section of the wall 3g2 in common with the box-shaped section 3p. If desired, the box-shaped section 3p can also delimit the first opening O1 for accessing the room or area delimited by the section itself and from here to the wiring opening CO.

Moreover, a passage opening PO can be formed in the base component 3, if desired at the bottom of the chamber defined by the box-shaped section 3p, if provided. A closing cap 14 can be housed, if desired by size or snap action, in this passage opening PO.

The base component 3 can then include a plurality of ribs 3q extending from the first internal face 3a, clearly designed to stiffen the base component 3 itself. In this regard, ribs 3q can be provided extending in one or more directions, for example front-back, side to side or oblique to the latter.

Advantageously, starting from the second face 3b of the base component 3 two first seats 3f1, if desired, projecting, are provided in the enlarged rear portion 3e, and/or a second seat 3f2, if desired, projecting, in the front portion or tip 3d as will be better described later, for constraining the fork 4.

With regard now the non-limiting embodiment of the casing or lid 9, if provided, it can include a rear portion 9a of such shape as to engage to size, if desired wrapping or abutting or being wrapped by the upper or free end of the projecting wall or walls 3g1-3g4 and, if desired, an elongated front portion 9b which extends up to and slightly beyond the through hole 3n. The rear portion 9a defines with the projecting wall(s) 3g1-3g4 the housing seat HZ for the printed circuit 5.

If desired, the front portion 9b is in abutting or wrapping or insertion engagement with the channel section 3m and with the section defining the through hole 3n as well as clearly, with the section of the felt between these elements 3m-3n, so as to define or delimit a conveying seat GS.

Basically, both the rear portion 9a and the front portion 9b of the casing or lid 9 define an area, preferably liquid or fluid tight, which comprises the housing seat HZ and a conveying seat GS adjacent and, according to the embodiment shown in the figures, front thereto, which are in communication through the groove 3h.

With such a clearly non-limiting structure, the printed circuit 5 is positioned in the housing seat HZ, while a power cable 12 is conveyed or guided through the groove 3h into the conveying seat GS and then through the through hole 3n and from here towards the electric power system of a bicycle.

Of course, another arrangement for the cable 12 could be arranged.

Alternatively, as indicated above, a battery power supply could be provided, arranged within or outside the area between the base component 3 and the casing or lid 9. In this case, the component connecting with the battery could extend or not as indicated above for the cable 12.

The casing or lid 9 can also include a wing section 9c designed to engage and, if desired, wrap the end of the box-shaped section 3p.

The second opening O2 can for example be formed in the wing section 9c of the casing or lid 9 which wraps or is wrapped or abuts in the box-shaped section 3p for the alignment of the first O1 and second opening O2.

A saddle 1 according to the present invention can be assembled with an assembly method in accordance with the present invention comprising the following steps:

positioning in a cavity 17a of a female part 17 of a mold 16 the seat component 2 with the heating and/or cooling element 6 (supported or not by the support layer 8) arranged on the internal surface 2b of the seat component 2, placing the outer surface 2a in contact with the cavity 17a;

arranging the base component 3 close to the seat component 2;

before or after this step of preparation of the base component 3, inserting over the or inject on the seat component 2 placed in the cavity 17 a fluid or liquid 11a for the formation of the padding 11, hardening or solidifying or letting the fluid or liquid of the padding 11 to harden or solidify in an internal zone IZ defined between the base component 3 and the seat component 2, assembling the base component 3 with the printed circuit 5, if this has not been done previously, wiring or connecting the connector 7 with the printed circuit 5.

As regards the step which involves assembling the base component 3 with the printed circuit 5, it can for example be carried out by inserting the printed circuit in the part of the housing seat HZ defined by the base component 3 and, if desired, closing it with screws, bolts, fitting or snap anchoring with the casing or lid 9 or by inserting the printed circuit 5 in the part of the housing seat HZ defined by the casing or lid 9 and closing it with the base component 3.

During this phase, if the structure described above is provided, the rear portion 9a engages with the upper or free end of the projecting wall or walls 3g1-3g4 and the front portion 9b engages by abutting or wrapping or insertion with the channel section 3m and the section defining the through hole 3n, previously positioning the printed circuit 5 in the housing seat HZ between projecting walls 3g1-3g4 and rear portion 9a and an electrically connected power supply cable 12 deriving from the printed circuit 5 between the channel section 3m and front portion 9b.

So far as the step of positioning the seat component 2 with the heating and/or cooling element 6 in a cavity 17a of a female part 17 of a mold 16 is concerned, it can be carried out by positioning the seat component 2 in the cavity 17a or better in the zone of the same defined by the female part, with a respective peripheral portion 2h partially resting on the surface of the female part 17 or of a first plate 19 arranged thereon.

At this point, a second plate 20 is actuated, so as to bring it into engagement against the first plate 19 to thus clamp the peripheral portion 2h of the cover or seat component 2 between them and thus a suction or vacuum source, such as a vacuum pump, can be activated so as to removably constrain the seat component 2 to the walls defining the impression or cavity 17a. Then, one cast or insert the liquid or fluid that must make up the padding 11 above the seat component 2 equipped with one or more heating elements 6, however, lifting the connector 7 so that it is not embedded in the aforementioned liquid or fluid.

Alternatively, this liquid or fluid could be introduced after the engagement of the base component 3 close to the seat component 2 and after the closure of the mold 16.

The step concerning the arrangement of the base component 3 close to the seat component 2 can be carried out manually, then proceeding to close the mold 16, thereby pressing the male part 18 of the mold against the base component 3 or better against the respective second face 3b or by first constraining the base component 3 to a male part 18 of the mold 16 or better to a punch or protruding part of this part 18 and then closing the mold 16 or better the respective female 17 and male 18 parts close to each other.

Once the base component 3 has been brought close to the seat component 2 so as to close a respective molding impression and once it is present (inserted before or after the abutment or engagement between the seat component 2 and the base component 3) the material for the padding 11 between the shell 3 and the cover 2, the mixture or material or liquid or fluid of the padding 11 reacts by solidifying or hardening and, if desired, filling part of the impression thus obtaining a molded padding 11.

In this regard, the liquid or fluid could comprise an expandable or foaming fluid, such as expanded polyurethane (PU).

Advantageously, during the arrangement step of the base component 3 close to the seat component 2, the connector 7 is put under tension as well as possibly one or more respective ends 6a of the heating and/or cooling element 6 making it to pass through the wiring opening CO and, if provided, through the openings O1, O2 and/or PO.

In this regard, the wire or cable can be put in traction by means of a false-socket which is coupled to the connector 7 and in turn towed with a cable wound in a spring winder or a stepper motor fixed, for example on the press of the mold carousel. In this case, simultaneously with the closure of the punch or male part 18 of the mold 16, the winder pulls the connector 7 towards the punch 18 until the complete closure of the mold 16.

The winder will preferably have a clutch or winding speed calibrated for the function it must perform.

If desired, the connector 7 will be connected to the socket 5a through the wiring opening CO of the base component 3.

Moreover, when the base component 3 is placed on the seat component 2, once the end 6a with the connector 7 has been passed through the various openings, the gasket 15, if provided, will be glued or fixed or abutted on the cover 9 (on a surface of the same proximal to the seat component 2) or to the base component 3 (depending on the embodiment), preferably sealing a respective opening, for example the second access opening O2.

At the end of the molding step, the mold 16 is opened and the male part 18 is moved away from the formed saddle. In this step, the base component 3 is adhered to the padding 11 and is not removed together with the male part 18.

At this point, the saddle 1 obtained is extracted, and then, if required, the trimming of the excess cover 2 is made.

At the end of the method or even before the trimming step, the connector 7 must be clearly wired or electrically connected to the printed circuit 5. In this regard, with reference to the non-limiting embodiment illustrated in the figures, this wiring step takes place by inserting the connector into the socket 5a of the printed circuit 5, for example after passing the connector 7 through the first opening O1, and then eventually closing the passage opening PO, if provided, with the closing cap 14.

However, a second male component could also be provided for making a sealing edge on the perimeter of the saddle.

As regards the steps of manufacturing the padding and any sealing edge, reference should be made for example to the international applications published under numbers WO2007020571A1 and WO2019166900A1.

It could also not be provided a method of obtaining as indicated above, but the felt, on one side, and the padding with the seat component, on the other, could be made separately and then the units thus obtained could be constrained, for example removably, by means of screws or other removable coupling means.

In such a case, the printed circuit could be disposed between such units, with or without the casing or lid.

Moreover, if the saddle 1 has a fork 4, then a step of assembling of this element 4 can be provided, for example by fitting the ends 4b, 4c of the respective prongs 4a in the seats 3f1, 3f2 or by constraining the fork 4 to the base component 3 by means of suitable coupling means.

Of course, if provided, the button or buttons 13 are then mounted.

It is therefore possible to mount the saddle 1 on the frame of a bicycle, if desired by constraining the saddle itself or a respective fork 4 to the seat post.

Moreover, if the bicycle is electric, then one could connect a cable 12 (for example coming out from the through hole 3n) for the power supply of the heating and/or cooling element 6 to the electric power supply system of the bicycle itself.

With reference now to FIGS. 15 to 20, a saddle 1a according to the present invention similar to the one illustrated above has been shown, but in which the lid component 9 is constrained to the second face 3b of the base component 3 or in any case outside the internal zone IZ.

In this case, the lid component 9 constitutes, once attached to the base component 3, part of the external face of the base component 3 or in any case a continuation of the second face 3b, since the lid component 9 is arranged and constrained to close a fitting opening FO defined or delimited by the base component 3.

In this case, the housing seat HZ for the printed circuit 5 defined between the casing or lid 9 and the base component 3 is outside the internal zone IZ.

More particularly, according to this embodiment, the housing seat HZ can be defined by a recessed area delimited by the base component 3 or by the respective second face and closed by the casing or lid 9. Moreover, in this case, the wiring opening CO is delimited by the base component 3 preferably, opening into the recessed area.

If desired, also in this case a gasket 15 is provided as indicated above, which preferably seals the wiring opening CO.

In accordance with this variant, the pressure or control button 13 can be integrated or constrained to the casing or lid 9.

Figure 1:
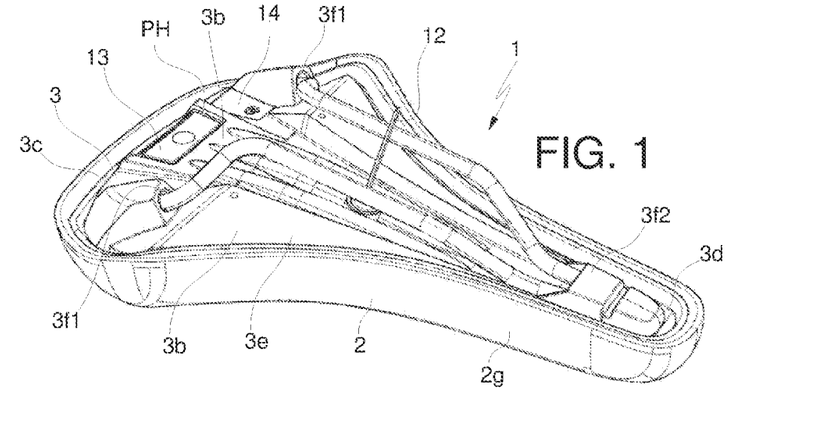
FIG. 1 is a bottom view of a saddle according to the present invention.
Figure 2:
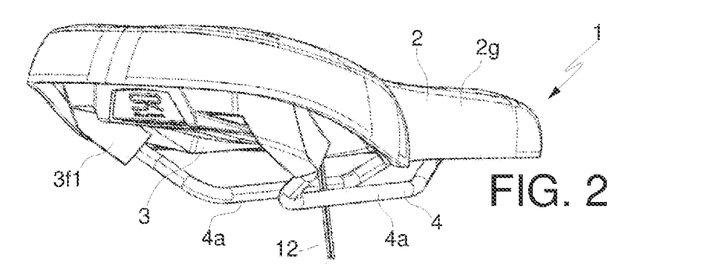
FIG. 2 is a perspective view slightly from the rear and from the bottom of the saddle of FIG. 1.
Figure 3:
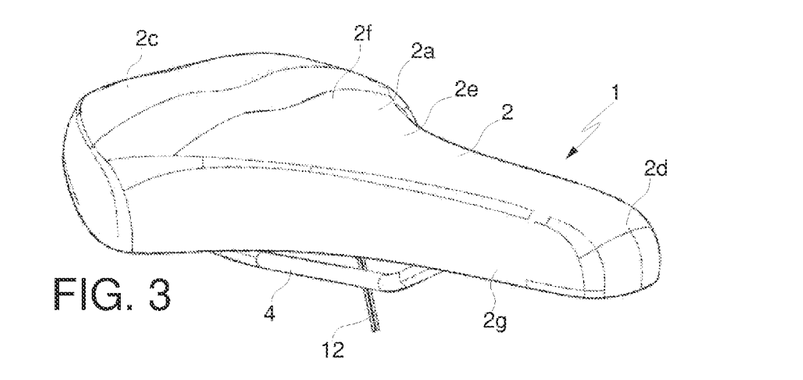
FIG. 3 is a perspective view slightly from the front and from the top of the saddle of FIG. 1.
Figure 4:
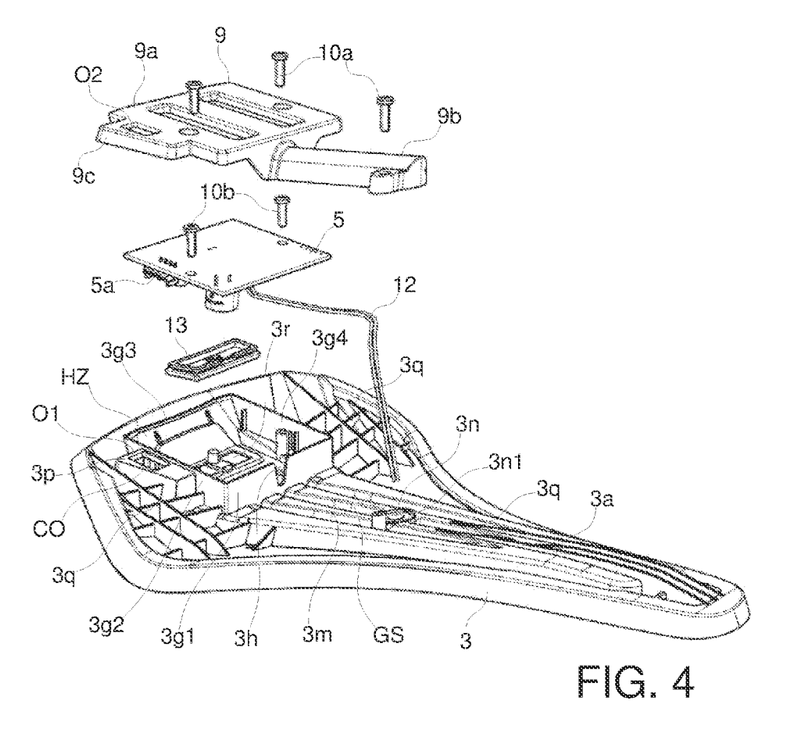
FIG. 4 is a perspective view from above of a step of a method according to the present invention for the connection of a casing or lid to a base component or felt of a saddle according to the present invention.
Figure 5:
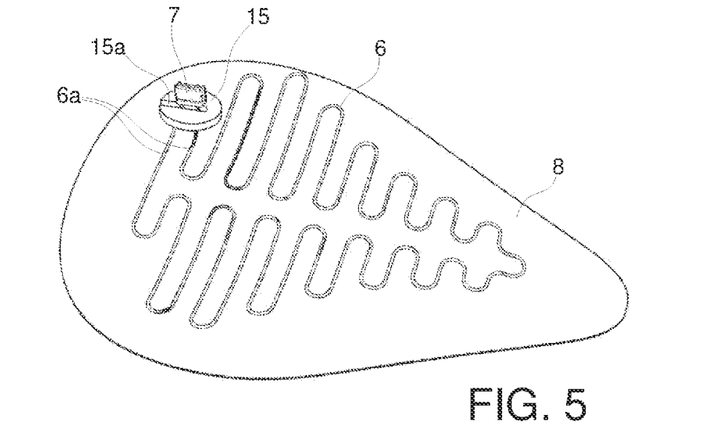
FIG. 5 shows a support layer with a heating and/or cooling element for a saddle according to the present invention.
Figure 6:
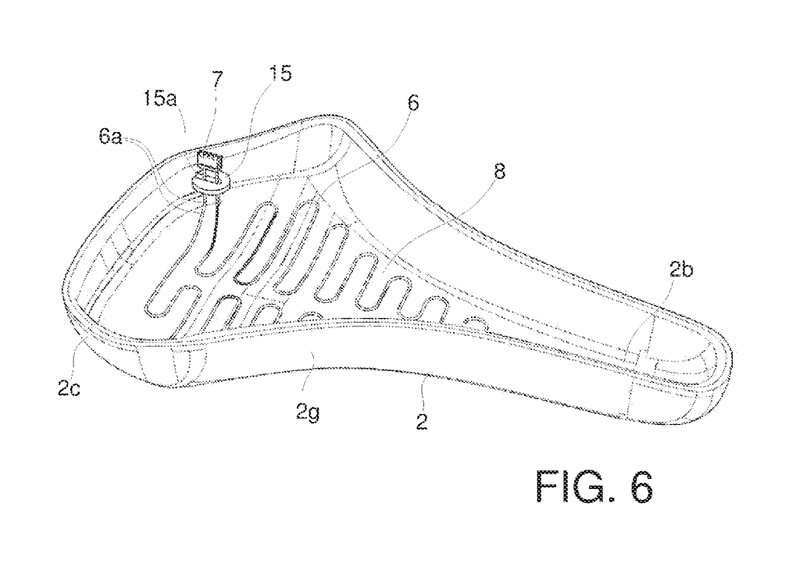
FIG. 6 shows the support layer with the heating and/or cooling element of FIG. 5 applied to a seat component of a saddle in accordance with the present invention.
Figure 7:
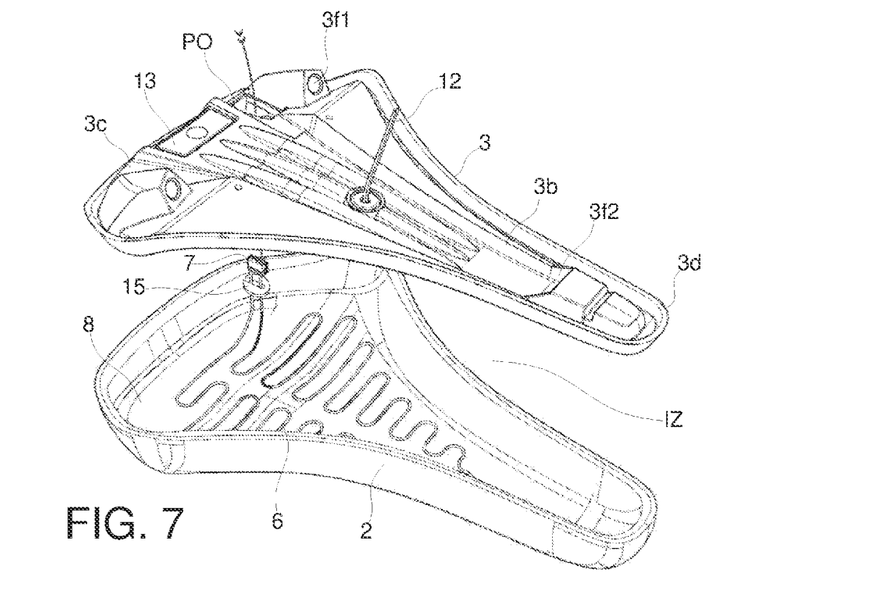
FIG. 7 shows an assembly step of a base component or felt to a seat component in accordance with a method according to the present invention.
Figure 8:
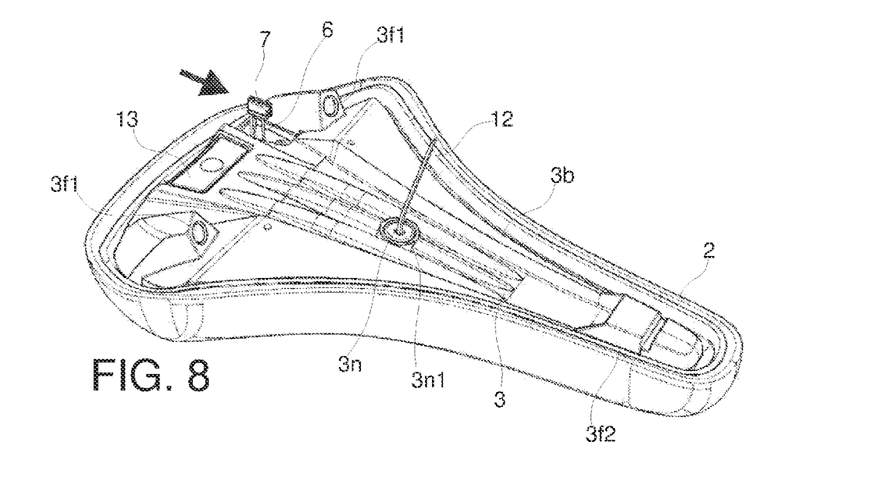
FIG. 8 shows the base component or felt and the seat component of FIG. 7 assembled to one another.
Figure 9:
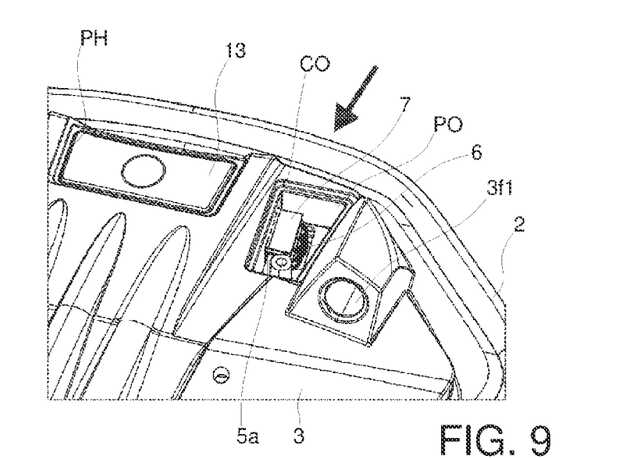
FIG. 9 is a detailed view showing the wiring of a connector with the printed circuit of a saddle according to the present invention.
Figure 10:
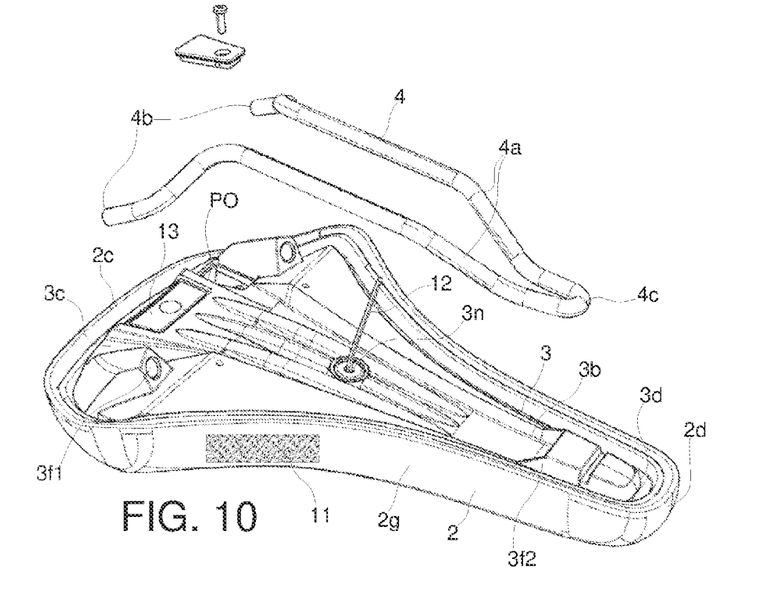
FIG. 10 shows the assembly of a fork and a cap or lid to the assembled group including base component or felt and seat component with a part removed to show the padding.
Figure 11:
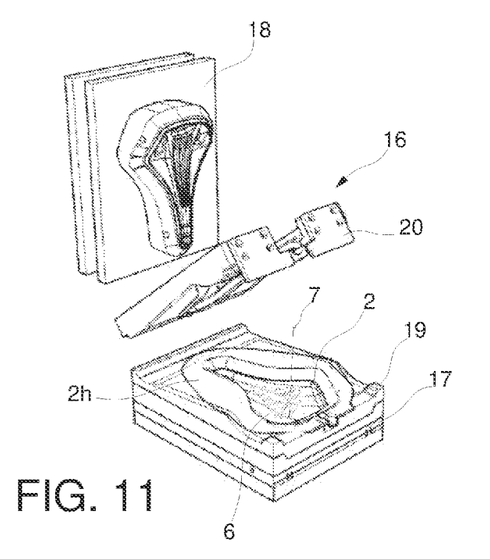
FIGS. 11 to 14 show the main steps of a method according to the present invention carried out by means of a relative mold.
Figure 12:
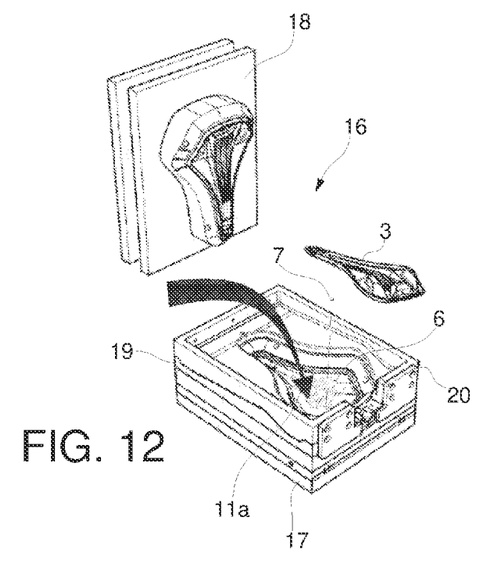
Figure 13:
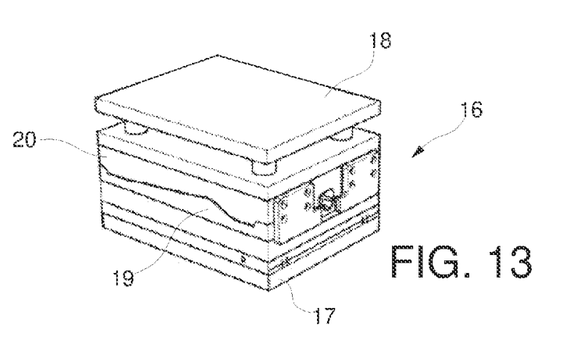
Figure 14:
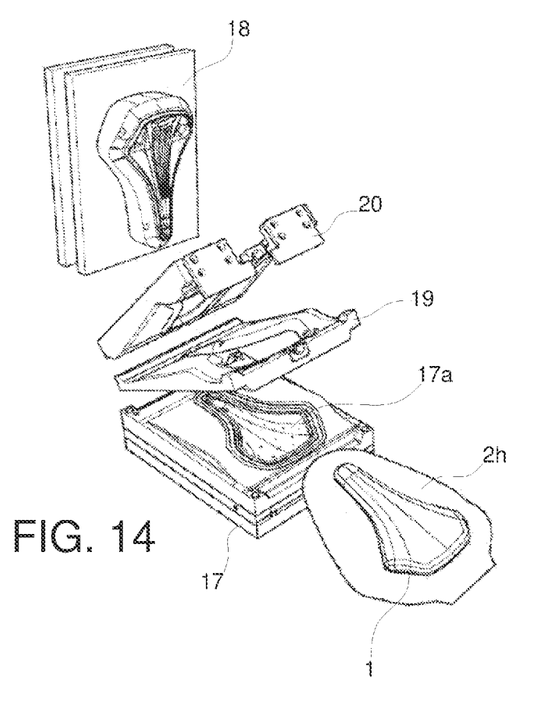
Figure 15:
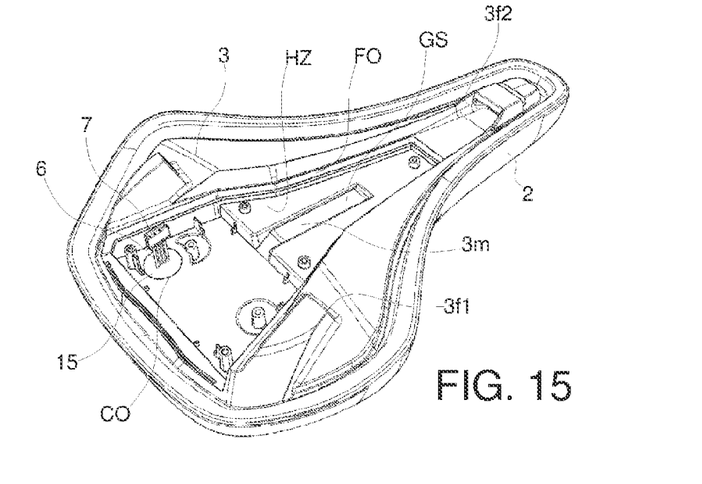
FIGS. 15 to 17 illustrate manufacturing steps of another saddle according to the present invention.
Figure 16:
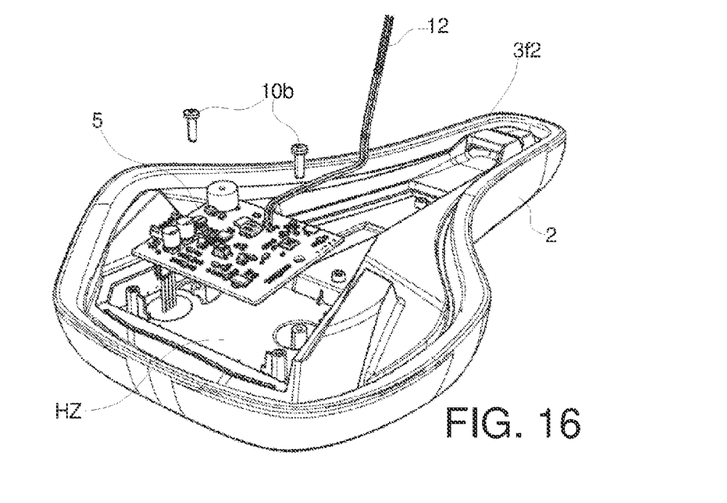
Figure 17:
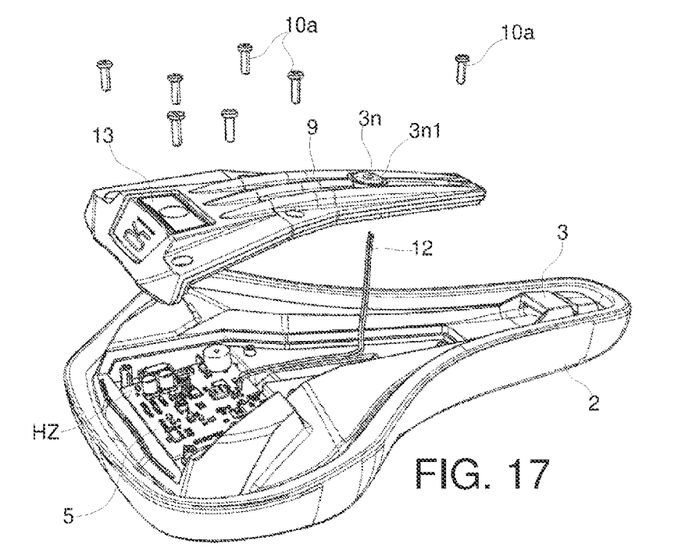
Figure 18:
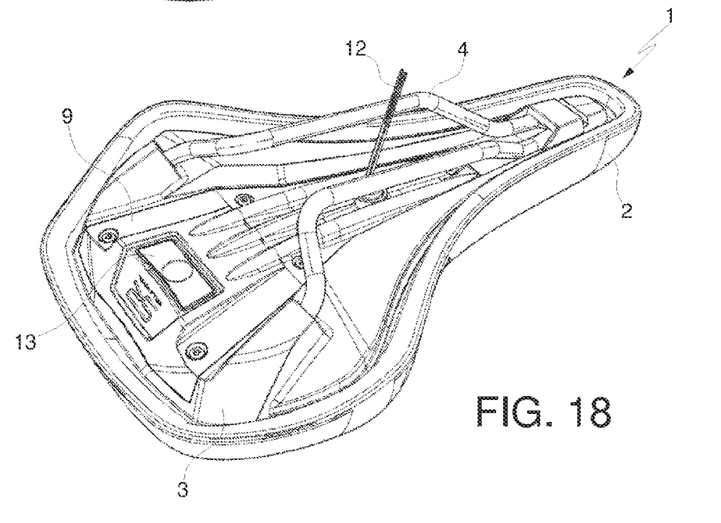
FIG. 18 illustrates a saddle obtained in accordance with the sequence of FIGS. 15 to 17.
Figures 19, 20:
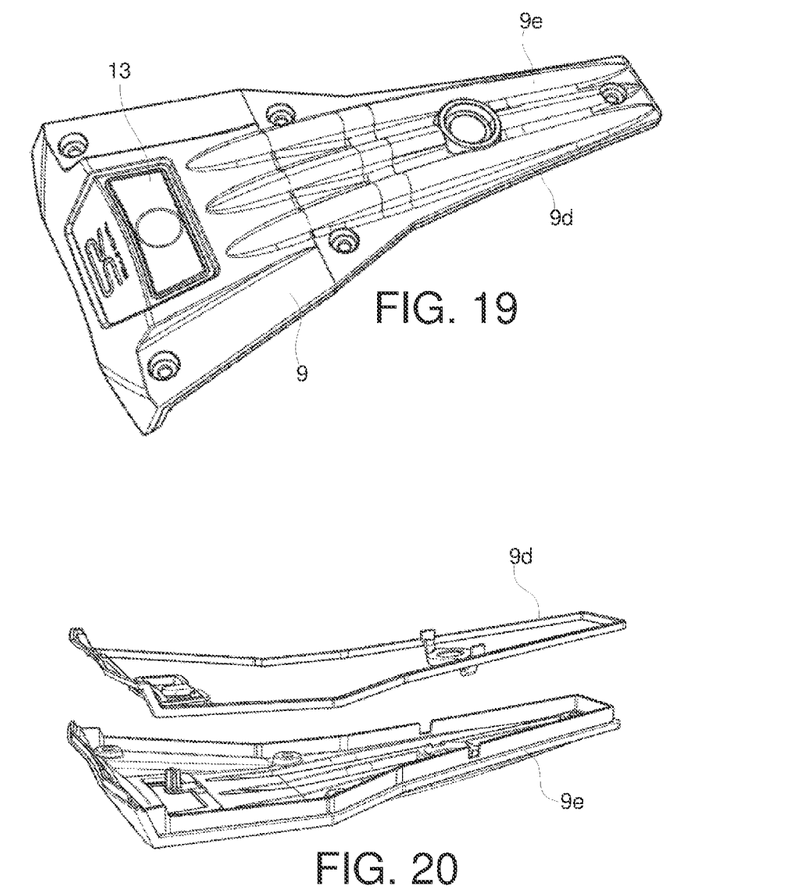
FIG. 19 is a perspective view illustrating the lid component of the saddle of FIG. 18.
FIG. 20 is an exploded view of the lid component of FIG. 19.

Moreover, the lid component 9 can, for example have a perimetral component made of soft material 9d and a main body 9e comprising the button 13 as an annular component with a plug 3n1 for the passage of power cables in soft material, if desired thermoplastic. The perimeter component 9d can act as a gasket once the saddle has been assembled.

The two parts 9d and 9e could be made by co-molding, so as to avoid manual assembly.

According to this non-limiting embodiment, the positioning housing of the button 13 is delimited by the casing or lid 9.

In accordance with the example of FIGS. 15 to 20, the through hole 3n is delimited in the casing or lid 9, although it could also be delimited in the base component 3.

A saddle 1 according to this embodiment can be assembled with an assembly method similar to the one indicated above.

Thus, for example, one could:
positioning in a cavity 17a of a female part 17 of a mold 16 the seat component 2 with the heating and/or cooling element 6 (supported or not by the support layer 8) arranged on the internal surface 2b of the seat component 2, placing the outer surface 2a in contact with the cavity 17a
arranging the base component 3, whether or not equipped with the printed circuit 5, close to the seat component 2;
before or after this step of arrangement of the base component 3, inserting over the or inject on the seat component 2 placed in the cavity 17 a fluid or liquid 11a for the formation of the padding 11,
hardening or solidifying or letting the fluid or liquid of the padding 11 to harden or solidify in an internal zone IZ defined between the base component 3 and the seat component 2,
arranging the printed circuit in the recessed seat or in any case on the second face 3b of the base component 3, if this had not been done before,
wiring or connecting the connector 7 with the printed circuit 5.

As regards the step which involves assembling the base component 3 with the printed circuit 5, it can for example be carried out by inserting the printed circuit in the part of the housing seat HZ defined by the base component 3 and, if desired, closing it with screws, bolts, fitting or snap fitting with the casing or lid 9 or by inserting the printed circuit 5 in the part of the housing seat HZ defined by the casing or lid 9 and closing it with the base component 3.

With regard to the various steps of the method, such as that of positioning in a cavity 17a of a female part 17 of a mold 16 of the seat component 2 with the heating and/or cooling element 6 or that of arranging the base component 3 close to the seat component 2, reference should be made to what previously disclosed.

Advantageously, even in this case, during the arrangement step of the base component 3 close to the seat component 2, the connector 7 is put under tension as well as possibly the same applies to one or more respective ends of the heating and/or cooling element 6.

Moreover, if a gasket 15 is provided, then by putting the connector under tension, the abutment, preferably with seal of the gasket against the base component or felt 7 and the closure the wiring opening CO, are determined.

Thanks to this embodiment, since the cover of the card has been displaced to the outside of the saddle, the assembly method is much simpler than the version previously provided.

As it will be understood, a saddle according to the present invention allows a user to activate, by pressing a button 13 or by remote control of the heating and/or cooling element 6, which provides for heating and/or cooling, preferably uniformly, the seat component 2 or the respective first support surface 2a. The subsequent pressing action of the button 13 or control of the remote control allows the deactivation of the heating and/or cooling element 6. The user can then choose, according to the needs, whether or not to activate the heating and/or cooling action of the saddle.

According to an embodiment, it could be possible to switch on with a single pressure, switch on with self-switching off defined by double pressing the button 13 and switching off with a long pressure of the button 13.

If a heating action is foreseen, then the temperature can, for example, increase up to a limit set by the factory, for example 35° C., this limit can be managed through a possible NTC sensor and the CPU board.

By incorporating microchips and firmware in the board, the system can be configured and possibly changed or adapted according to the needs, for example by the customer, who can change the operating settings by pressing the button or a remote control.

Thus, for example, during the winter season the user can choose to activate the saddle heating mode to be less affected by the cold, while during the summer season he can activate the cooling mode or can use only one of this mode (heating or cooling) depending on the saddle equipment.

Moreover, the structure with casing or lid 9 ensures good insulation of the printed circuit 5 in particular if the padding in the mold is obtained as above indicated. The possible presence of the wiring opening CO and, if desired, the first O1 and/or second O2 opening, then allows for optimal conveying or guidance of the connectors and cables.

It has thus been seen that the present invention fully achieves the proposed objects.

Modifications and variants of the invention are possible within the scope defined by the claims.

The invention claimed is:

1. A saddle for vehicles comprising a seat component defining a support surface for a user and a base component to which said seat component is constrained or connected, said base component comprising a first internal face facing towards said seat component and defining therewith an internal zone (IZ) of said saddle and a second face facing away from said seat component, further comprising at least one printed circuit, at least one heating and/or cooling element and/or at least one sensor as well as at least one connector designed to wire or electrically connect said at least one printed circuit and said at least one heating and/or cooling element and/or said at least one sensor, said at least one heating and/or cooling element and/or said at least one sensor being interposed between said seat component and said base component or connected to or embedded in or disposed within said seat component, said saddle comprising at least one casing or lid attached to said base component, said at least one casing or lid and said base component defining among them at least one housing seat (HZ), said at least one printed circuit being housed in said at least one housing seat (HZ), said at least one casing or lid is constrained to said first internal face of said base component, so that said at least one housing seat (HZ) is within said internal zone (IZ) or said at least one casing or lid is constrained to said second face of said base component, so that said at least one housing seat (HZ) is outside of said internal zone (IZ), said saddle comprising a padding within said internal zone (IZ) obtained by pouring or injecting a liquid or fluid into said internal zone (IZ) and subsequent hardening or solidification of the same, wherein said at least one housing seat (HZ) is fluid tight so as to prevent the passage or entry thereinto from the internal zone (IZ) of the liquid or fluid for making the padding before it hardens or solidifies.

2. The saddle according to claim 1, wherein said at least one heating and/or cooling element is constituted by an electric resistance.

3. The saddle according to claim 1, comprising a support layer and wherein said at least one heating and/or cooling element and/or said at least one sensor is embedded in or connected to said support layer, said support layer being laid or placed on or in contact with the internal surface of said seat component.

4. The saddle according to claim 1, wherein said base component and/or a casing or lid defining or delimiting with said base component a housing seat (HZ) of said printed circuit, delimits at least one through wiring opening (CO) and in this case said at least one connector passes through said at least one wiring opening (CO) for reaching in such manner the printed circuit, said at least one wiring opening (CO) putting the internal zone (IZ) into communication with the housing seat (HZ) or in any case with the positioning area of said at least one printed circuit.

5. The saddle according to claim 4, wherein at least one socket of said at least one printed circuit protrudes or is accessible through said at least one wiring opening (CO) for the passage and connection of said at least one connector.

6. The saddle according to claim 4, wherein said base component, at the first internal face has at least one projecting wall defining part of the housing seat (HZ) for said at least one printed circuit.

7. The saddle according to claim 6, wherein said base component comprises a box-shaped section even formed at or starting from the first internal face, next to the zone defined by said at least one projecting wall and with a section of wall in common with said at least one projecting wall.

8. The saddle according to claim 6, wherein said at least one wiring opening (CO) is formed in said at least one projecting wall.

9. The saddle according to claim 6, wherein said casing or lid includes a rear portion with a shape suitable for engaging to size, if desired winding or abutting or being wrapped by the upper or free end of said at least one projecting wall, said rear portion defining with said at least one projecting wall the housing seat (HZ) for said printed circuit.

10. The saddle according to claim 6, comprising a groove or opening in said at least one projecting wall opening in a channel section with respective delimitation walls extending from said at least one projecting wall up to a middle portion or closer to the front of the base component, said base component then delimiting a through hole at the channel section.

11. The saddle according to claim 10, wherein said casing or cover comprises an elongated front portion which extends to and beyond said through hole, said front portion being in abutment or winding or insertion engagement with said channel section and with the section defining the through hole, so as to define or delimit a conveying seat (GS), and wherein said cable for powering departing from the printed circuit is conveyed or guided into the conveying seat (GS) and then through the through hole.

12. The saddle according to claim 1, wherein the area defined by the perimeter of said at least one heating and/or cooling element in contact or within said seat component or the sum of the areas defined by the perimeters of heating elements in contact or within said seat component is equal to at least 5% of a first surface of the seat component.

13. The saddle according to claim 1, wherein said at least one heating and/or cooling element and/or said at least one sensor is powered through a rechargeable or non-rechargeable battery, said battery being connected with said at least one circuit printed via at least one connection component.

14. The saddle according to claim 1, comprising:
a button for pressing a respective portion of said at least one printed circuit for activating or deactivating said at least one heating and/or cooling element, and/or
a communication module with a remote control, said module being integrated in said at least one printed circuit so as to allow activation by remote control of said at least one heating and/or cooling element.

15. The saddle according to claim 1, comprising at least one gasket applied on at least one terminal end of said at least one heating and/or cooling element and/or of said at least one sensor, said at least one connector being mounted on said at least one terminal end, said at least one gasket being disposed to close an opening (CO, O1, O2) for bringing said connector out of said internal zone (IZ).

16. A bicycle or motorcycle comprising a frame and the saddle according to claim 1, constrained and supported by said frame or by a seat post of the frame.

17. The bicycle according to claim 16, comprising an electric bicycle with an electrical supply system,
said saddle comprising a cable departing from the at least one printed circuit and arranged to connect and power the heating and/or cooling element with an electrical supply system of a respective electric bicycle,
wherein the at least one printed circuit is in electrical connection via said cable departing therefrom with said electrical supply system.

18. A method of assembling the saddle according to claim 1, comprising the steps of:
positioning said seat component with said at least one heating and/or cooling element and/or said at least one sensor arranged on the internal surface of the seat component in a cavity of a female part of a mold, placing the external surface in contact with the cavity;
arranging the base component close to the seat component;
before or after this arranging step of the base component, inserting over or injecting on the seat component placed in the cavity a fluid or liquid for the formation of the padding,
hardening or solidifying or let the fluid or liquid of the padding to harden or solidify in an internal seat (IZ) defined between the base component and the seat component,
assembling said base component with said at least one printed circuit, if this had not been done before, and
wiring or connecting said at least one connector with said at least one printed circuit.

19. The method according to claim 18, wherein the step of assembling said base component with said at least one printed circuit is carried out by inserting said at least one printed circuit in the part of the housing seat (HZ) defined by the base component and closing it with the casing or lid or by inserting said at least one printed circuit in the part of the housing seat (HZ) defined by the casing or lid and closing it with the base component.

20. The method according to claim 18, wherein during the arranging step of the base component close to the seat component, said at least one connector is tensioned making it to pass through said wiring opening (CO).

21. A saddle for an electric bicycle, comprising a seat component defining a support surface for a user and a base component to which said seat component is constrained or connected, said base component comprising a first internal face facing towards said seat component and defining therewith an internal zone (IZ) of said saddle and a second face facing away from said seat component, further comprising at least one printed circuit, at least one heating and/or cooling element and/or at least one sensor as well as at least one connector designed to wire or electrically connect said at least one printed circuit and said at least one heating and/or cooling element and/or said at least one sensor, said at least one heating and/or cooling element and/or said at least one sensor being interposed between said seat component and said base component or connected to or embedded in or disposed within said seat component, said saddle comprising a cable departing from the printed circuit and arranged to connect and power the heating and/or cooling element with an electrical supply system of a respective electric bicycle.

22. The saddle according to claim 21, wherein it is not provided with a battery.

\* \* \* \* \*